(12) United States Patent
Kawasumi

(10) Patent No.: US 11,006,084 B2
(45) Date of Patent: May 11, 2021

(54) COLOR SEPARATION AND COMBINATION OPTICAL SYSTEM AND IMAGE PROJECTION APPARATUS HAVING THE SAME

(71) Applicant: CANON KABUSHIKI KAISHA, Tokyo (JP)

(72) Inventor: Takehito Kawasumi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 19 days.

(21) Appl. No.: 16/506,431

(22) Filed: Jul. 9, 2019

(65) Prior Publication Data
US 2020/0021783 A1 Jan. 16, 2020

(30) Foreign Application Priority Data
Jul. 12, 2018 (JP) .............................. JP2018-131994

(51) Int. Cl.
*H04N 9/31* (2006.01)
*G02B 5/04* (2006.01)
*G02B 27/14* (2006.01)

(52) U.S. Cl.
CPC ............. *H04N 9/3105* (2013.01); *G02B 5/04* (2013.01); *G02B 27/141* (2013.01); *H04N 9/3141* (2013.01)

(58) Field of Classification Search
CPC ...... H04N 9/3105; H04N 9/3141; G02B 5/04; G02B 27/141; G03B 21/2066; G03B 21/28
See application file for complete search history.

(56) References Cited

U.S. PATENT DOCUMENTS

| 6,549,338 B1 | 4/2003 | Wolverton et al. |
| 9,866,806 B2 | 1/2018 | Teramoto et al. |

(Continued)

FOREIGN PATENT DOCUMENTS

| EP | 1315028 A1 | 5/2003 |
| WO | 2015194454 A1 | 12/2015 |
| WO | 2016098365 A1 | 6/2016 |

OTHER PUBLICATIONS

Partial European Search Report issued by the European Patent Office dated Dec. 13, 2019 in corresponding European Patent Application No. 19185265.6.

(Continued)

*Primary Examiner* — Michelle M Iacoletti
*Assistant Examiner* — Magda Cruz
(74) *Attorney, Agent, or Firm* — Carter, DeLuca & Farrell LLP

(57) ABSTRACT

A color separation and combination system includes a first optical system including a first optical plane, and a second optical system including second to fourth optical planes. The first optical plane guides light from a light source to the second optical plane. The second optical plane guides first color light among light from the first optical plane to the third optical plane, and guides second color light among the light from the first optical plane. The third optical plane totally reflects the first color light toward the first image display element, and totally reflects light from the first image display element toward the projection optical system. The fourth optical plane totally reflects the second color light toward the second image display element, and totally reflects light from the second image display element toward the projection optical system.

9 Claims, 7 Drawing Sheets

(56) References Cited

U.S. PATENT DOCUMENTS

| | | | |
|---|---|---|---|
| 2002/0163625 A1* | 11/2002 | Tabuchi | G02B 7/008 |
| | | | 353/31 |
| 2003/0048423 A1* | 3/2003 | Aastuen | G02B 27/1026 |
| | | | 353/31 |
| 2003/0098955 A1* | 5/2003 | Okuyama | G03B 21/005 |
| | | | 353/31 |
| 2016/0041458 A1 | 2/2016 | Chung et al. | |
| 2016/0085081 A1* | 3/2016 | Teramoto | G03B 33/12 |
| | | | 353/33 |
| 2016/0277717 A1* | 9/2016 | Terada | G03B 21/005 |
| 2017/0142378 A1* | 5/2017 | Terada | G02B 27/149 |
| 2018/0239230 A1* | 8/2018 | Pettitt | G03B 33/06 |
| 2018/0259839 A1* | 9/2018 | Okuda | G03B 33/12 |
| 2020/0186762 A1* | 6/2020 | Takahashi | H04N 9/3188 |

OTHER PUBLICATIONS

Extended European Search Report issued by the European Patent Office dated May 19, 2020 in corresponding European Patent Application No. 19185265.6.

* cited by examiner

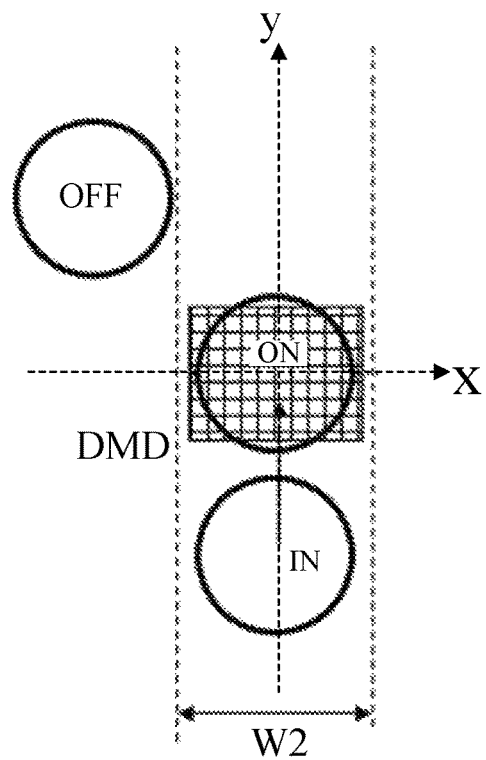
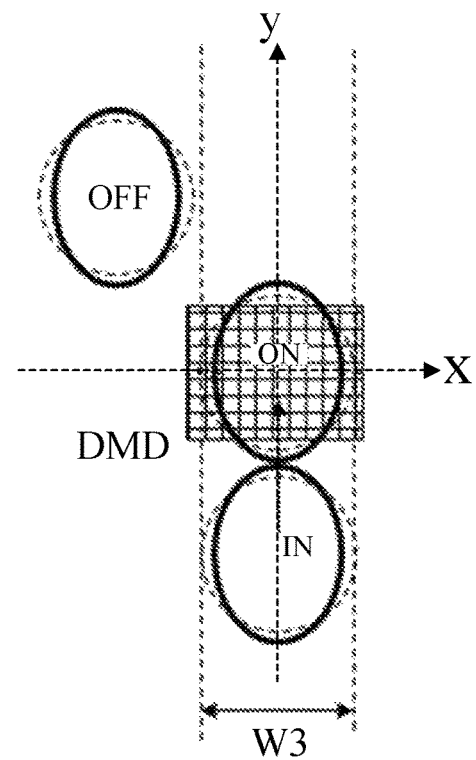
FIG. 7A  FIG. 7B
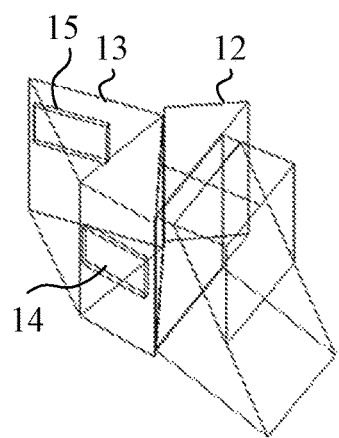
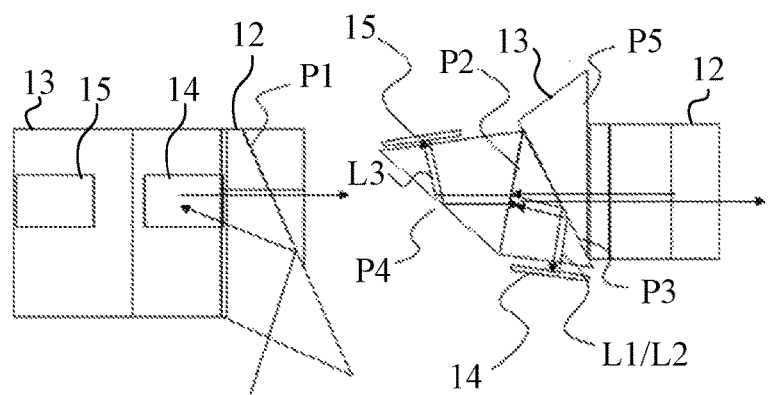
FIG. 8A  FIG. 8B  FIG. 8C

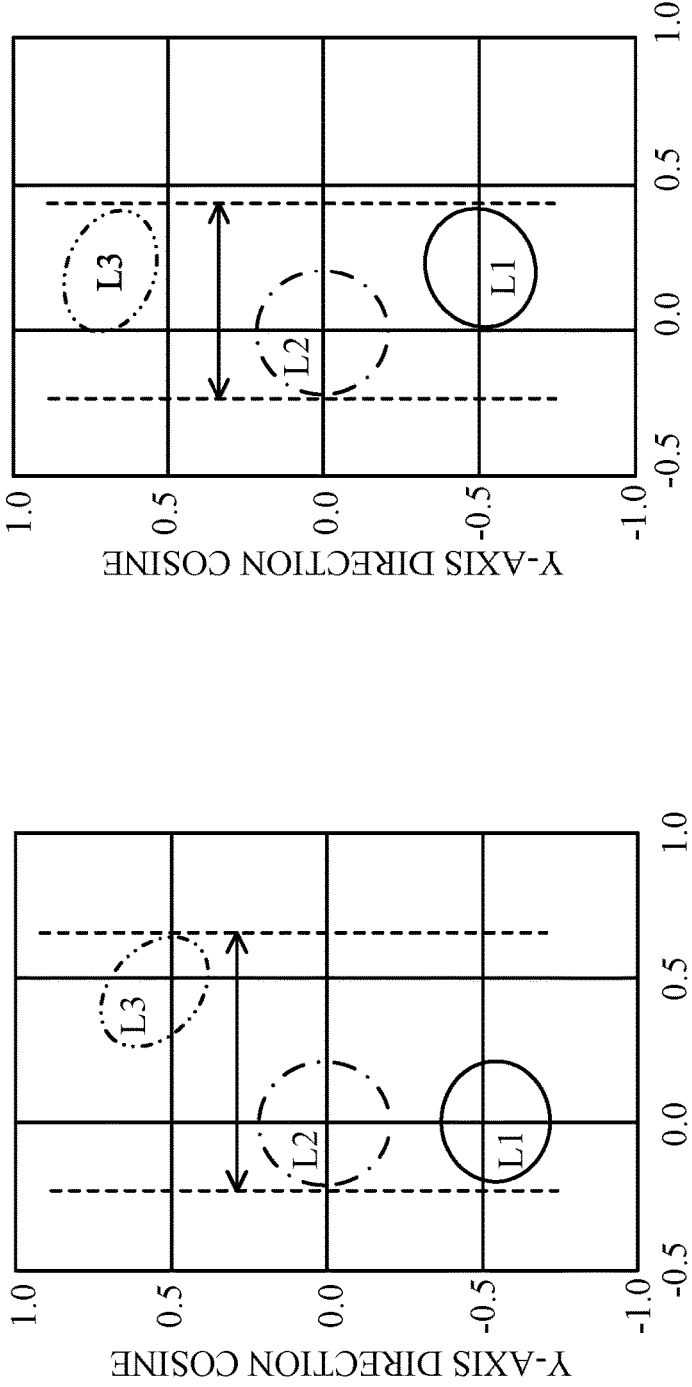

COLOR SEPARATION AND COMBINATION OPTICAL SYSTEM AND IMAGE PROJECTION APPARATUS HAVING THE SAME

BACKGROUND OF THE INVENTION

Field of the Invention

The present invention relates to relates to a color separation and combination optical system and an image projection apparatus having the same.

Description of the Related Art

There has conventionally known an image projection apparatus or a so-called projector that emits a light flux (or beam) generated from a light source to an image display element, modulates the light flux according to an input video signal at the image display element, and projects this light flux through a projection optical system. The image display element can have a variety of forms, and one of them is a mirror reflection type image display element such as a digital micromirror device (referred to as registered trademark DMD hereinafter).

In the DMD, a plurality of pixels each have a micromirror, are spread on one surface, and form an image display area. The plurality of micromirrors are respectively switchable between two inclination positions, i.e., the ON state and the OFF state, corresponding to the image information. When the illumination light enters the image display area along a direction orthogonal to the rotation axis of the micromirror and inclined by a desired angle (generally 34°) relative to the normal of the image display area and the plurality of micromirrors are turned to the ON states, the light flux is reflected in the direction substantially normal to the image display area. Thereby, an image is projected through the projection optical system. When the plurality of micromirrors are turned to the OFF states, the light flux is reflected to the outside of the projection optical path. The reflected light flux is treated as unnecessary light. In addition, the gradation is expressed and the image can be displayed by switching the plurality of micromirrors between the ON states and the OFF states at high speeds in one frame of the image information.

The light flux (referred to as OFF light hereinafter) reflected while the plurality of micromirrors are in the OFF states is light having the same high power as that of the light flux (referred to as ON light hereinafter) reflected in the ON states, and is processed by usually absorbing it in an absorber, such as metal, and by cooling the absorber. It is necessary to secure a proper optical path for guiding the OFF light to the absorber in a prism disposed in the just near the DMD. If the proper optical path cannot be secured, stray light in the prism may drop the contrast of the projected image, or stray light that has entered the projection optical system and then the lens barrel causes a temperature rise and the resolution performance degradation. In addition, when light is unintentionally enters a mechanical component, the component may emit smoke, be melted, or the like.

On the other hand, the proper optical path configured to guide the OFF light to the absorber in the prism may increase the size of the prism. As the size of the prism increases, the back focus of the projection optical system becomes longer and the projection optical system becomes larger.

WO 2015/194454 discloses a projector that secures the proper optical path in the prism and rotates the DMD relative to the prism so as to properly absorb the OFF light in a radiator and thereby to avoid a large size of the prism. FIGS. 12A and 12B illustrate the angular distribution of the light flux before and after it enters the DMD in the projector in WO2015/194454. FIG. 12A illustrates the angular distribution of the light flux before the DMD is rotated. FIG. 12B illustrates the angular distribution of the light flux after the DMD is rotated. Since the OFF light (unnecessary light) L3 has a vector component in a direction (X-axis direction) orthogonal to the incident direction (Y-axis direction) of the illumination light L1, the optical path when secured to guide the OFF light L3 to the absorber will make wider the prism as illustrated by the interval of the dotted line part in the figure. The optical unit in WO 2015/194454 rotates the DMD relative to the prism, thereby narrowing a distance in the X direction between ON light (projection light) L2 and the OFF light L3, and reducing the prism width.

In the projector of WO 2015/194454, the OFF light L3 necessarily has a vector component in the direction orthogonal to the incident direction of the illumination light L1 due to the operating principle of the DMD. Therefore, even if the DMD is rotated, there is a miniaturization limit in principle. In addition, in the projector of WO 2015/194454, since the OFF light L3 is guided to a place just above the ON light L2, it is necessary to dispose a processing unit for the OFF light between the projection optical system and the prism. In order to properly process the OFF light, the OFF light processing unit requires cooling and a certain amount of space. At this time, the back focus of the projection optical system may be made longer. Since the image display element actually includes a drive circuit board and a heat sink for cooling, these components and the prism may interfere with each other if the DMD is rotated. In order to avoid the interference, it is necessary to separate the image display element from the prism for the spatial latitude, which also causes a longer back focus of the projection optical system.

SUMMARY OF THE INVENTION

The present invention provides a color separation and combination system and an image projection apparatus having the same, each of which can make smaller a color separation prism configured to guide light to a mirror reflection type image display element.

A color separation and combination system according to one aspect of the present invention is configured to guide the light from a light source to a first image display element and a second image display element, to combine light from the first and second image display elements, and to guide combined light to a projection optical system. The color separation and combination system includes a first optical system including a first optical plane, and a second optical system including a second optical plane, a third optical plane, and a fourth optical plane. The first optical plane guides the light from the light source to the second optical plane. The second optical plane guides first color light among light from the first optical plane to the third optical plane, and guides second color light having a wavelength different from that of the first color light among the light from the first optical plane. The third optical plane totally reflects the first color light toward the first image display element, and totally reflects light from the first image display element toward the projection optical system. The fourth optical plane totally reflects the second color light toward the second image display element, and totally reflects light from the second image display element toward the projection optical system.

A color separation and combination system according to one aspect of the present invention includes a prism optical system, and configured to guide the light from a light source to a first image display element and a second image display element using the prism optical system, to combine light from the first and second image display elements, and to guide combined light to a projection optical system. The prism optical system includes a first optical plane configured to receive light from the light source, a second optical plane configured to receive light from the first optical plane, a third optical plane configured to guide light from the second optical plane to the first image display element, and a fourth optical plane configured to totally reflect the light from the second optical plane toward the second image display element.

An image projection apparatus including the above color separation and combination system also constitutes another aspect of the present invention.

Further features of the present invention will become apparent from the following description of exemplary embodiments with reference to the attached drawings.

BRIEF DESCRIPTION OF THE DRAWINGS

FIGS. 7A and 7B compare angular distributions of a light flux before and after the light flux enters the image display element (second embodiment).

FIGS. 8A to 8C are configuration diagrams of a color separation and combination system according to a third embodiment.

FIGS. 12A and 12B illustrate angular distributions of a light flux before and after the light flux enters a digital micromirror device (prior art).

DESCRIPTION OF THE EMBODIMENTS

Figure 1:
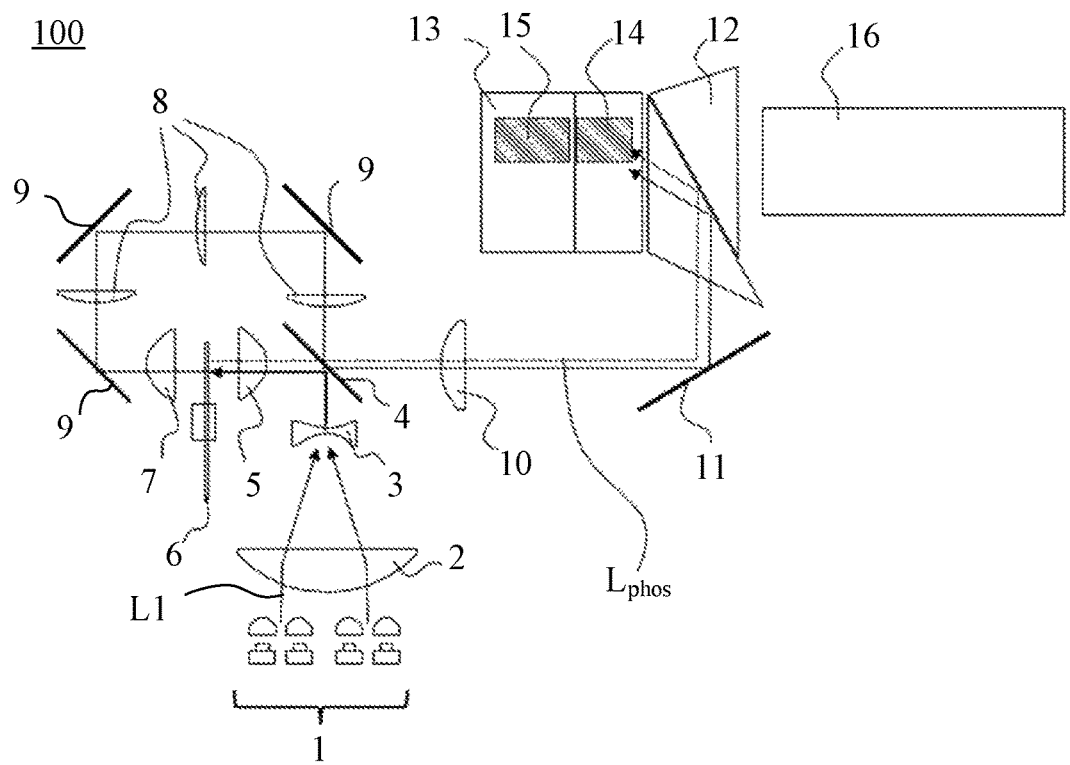
FIG. 1 is a block diagram of an image projection apparatus according to a first embodiment.

Referring now to the accompanying drawings, a description will be given of embodiments according to the present invention. Corresponding elements will be designated by the same reference numerals, and a duplicate description thereof will be omitted.

First Embodiment

FIG. 1 is a block diagram of an image projection apparatus 100 according to a first embodiment. The image projection apparatus includes a light source unit, an illumination optical system 10, an optical path deflection mirror 11, a total reflection prism (first optical system) 12, a color separation prism (second optical system) 13, a first image display element 14, a second image display element 15, and a projection optical system 16. The light source unit includes a blue laser light source 1, a positive lens 2, a negative lens 3, a dichroic mirror 4, a condenser lens 5, a phosphor (or fluorescent) wheel 6, a collimator lens 7, a relay lens system 8, and an optical path deflection mirror 9. The first image display element 14 and the second image display element 15 are mirror reflection type image display elements such as the DMD. Each image display element can transfer from one of a first state in which the plurality of micromirrors are in the ON states and the light flux is reflected in the normal direction of the image display area, and a second state in which the plurality of micromirrors are in the OFF states and the light flux is reflected in a direction that is inclined to the normal direction to the other. The projection optical system 16 projects the light from the illumination optical system onto the projection surface. In this embodiment, the total reflection prism 12 and the color separation prism 13 constitute a color separation and combination system. An optical unit includes the light source unit, the color separation and combination system, the first image display element 14, and the second image display element 15.

A plurality of blue laser light sources 1 are arranged to generate blue light each having a main wavelength of 450 nm. A plurality of light fluxes emitted from the plurality of blue laser light sources 1 travel toward the positive lens 2 as parallel light fluxes. Herein, an arrow L1 indicated by a solid line in the drawing represents the blue light. The blue light L1 is condensed by the positive lens 2 and collimated by the negative lens 3. Thereby, the width of the blue light L1 is set to a proper size. The blue light L1 emitted from the negative lens 3 enters the dichroic mirror 4. The dichroic mirror 4 has a spectral characteristic that reflects light in a wavelength band of 470 nm or less and transmits light in a wavelength band of 470 nm or higher. Thus, the blue light L1 is reflected by the dichroic mirror 4 and enters the condenser lens 5. The blue light L1 incident on the condensing lens 5 is condensed on the phosphor wheel 6.

In the phosphor wheel 6, a phosphor layer in which a phosphor member is fixed by a binder is formed on the circumference of a metal wheel having a high thermal conductivity such as high reflection aluminum. In a partial region of the phosphor layer, the metal wheel is notched, and a light transmitting diffuse layer is formed instead. The diffuse layer may be ground glass or a micro lens array. As the phosphor wheel rotates, the blue light L1 may be collected on the phosphor layer or the blue light L1 may be collected on the diffuse layer.

When the blue light L1 is condensed on the phosphor layer, the blue light L1 is absorbed by the phosphor member and the phosphor member is excited. As a result, the blue light L1 is converted into phosphor light $L_{phos}$ indicated by the dotted line in the figure, which has a broad spectral distribution of 480 nm to 700 nm. The phosphor light $L_{phos}$ is generated in all directions, but since the substrate of the phosphor wheel 6 is a metal wheel having a high reflectance, most components are reflected and travel toward the condenser lens 5.

The phosphor light $L_{phos}$ incident on the condenser lens 5 enters the dichroic mirror 4. As described above, the dichroic mirror 4 has a spectral characteristic of transmitting light in the wavelength band of 470 nm or higher. Thus, the phosphor light $L_{phos}$ passes through the dichroic mirror 4 and is emitted from the light source unit to the illumination optical system 10.

On the other hand, when the blue light L1 is condensed on the diffuse layer, the blue light L1 is diffused while transmitting through the diffuse layer and enters the collimator lens 7 since the metal wheel is notched in the region corresponding to the diffuse layer. The blue light L1 incident on the collimator lens 7 enters the dichroic mirror 4 again via the relay lens system 8 and the optical path deflection mirror 9. Since the blue light L1 travels to the dichroic mirror 4 from the upper side in the drawing, it is reflected toward the illumination optical system 10 and emitted from the light source unit. By rotating the phosphor wheel 6, the blue light L1 and phosphor light $L_{phos}$ are sequentially emitted from the light source unit.

The light flux incident on the illumination optical system 10 is turned into a proper shape by the illumination optical system 10 and guided to the color separation and combination system via the deflection mirror 11. The illumination optical system 10 includes an optical element, such as a fly's eye lens, a rod integrator, and a condenser lens that superimposes a light flux from them on the image display element in order to uniformly illuminate the image display element, but a description thereof will be omitted here.

Figures 2A, 2B, 2C:
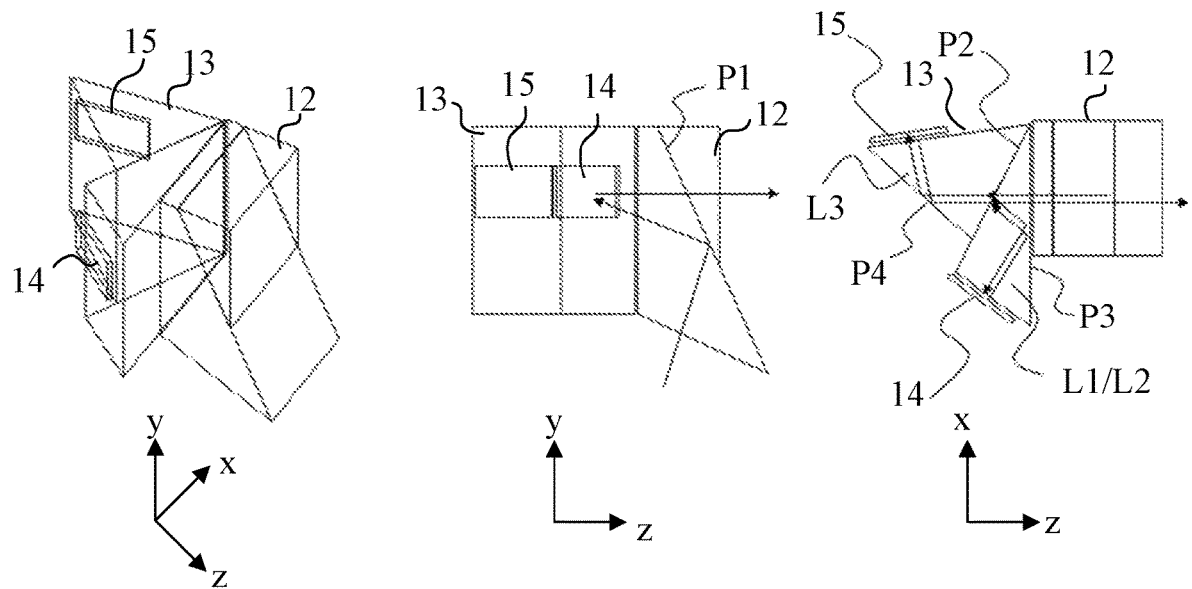
FIGS. 2A to 2C are block diagrams of a color separation and combination system according to the first embodiment.

FIGS. 2A to 2C are configuration diagrams of the color separation and combination system according to this embodiment. FIGS. 2A-2C respectively illustrate a three-dimensional view, a side view, and a top view of the color separation and combination system. The total reflection prism 12 is an optical element in which two prisms are joined via a P1 plane (first optical plane). When the light flux enters the total reflection prism 12, the light path is bent by a total reflection on the P1 plane. The deflected light flux enters the color separation prism 13. An air gap layer of about 10 μm is adjacent to the P1 plane.

The color separation prism 13 is an optical element in which two triangular prisms are joined via a P2 plane (second optical plane), and has a spectral characteristic of reflecting the blue light band of 430 nm to 480 nm and the red light band of 600 to 700 nm, and of transmitting the green light band of 490 nm to 590 nm. This embodiment includes the dielectric multilayer film in the P2 plane.

The phosphor light $L_{phos}$ having a spectral distribution of 480 nm to 700 nm, which is emitted from the light source unit and totally reflected by the P1 plane, is separated into red light L2 and green light L3 by the P2 plane. The red light L2 is totally reflected by the P3 plane (third optical plane) of the color separation prism 13 and enters the first image display element 14. The green light L3 is totally reflected by the P4 plane (fourth optical plane) of the color separation prism 13 and enters the second image display element 15. The blue light L1 emitted from the light source unit is reflected by the P2 plane, then is totally reflected by the P3 plane, and enters the first image display element 14.

Figures 3A, 3B:
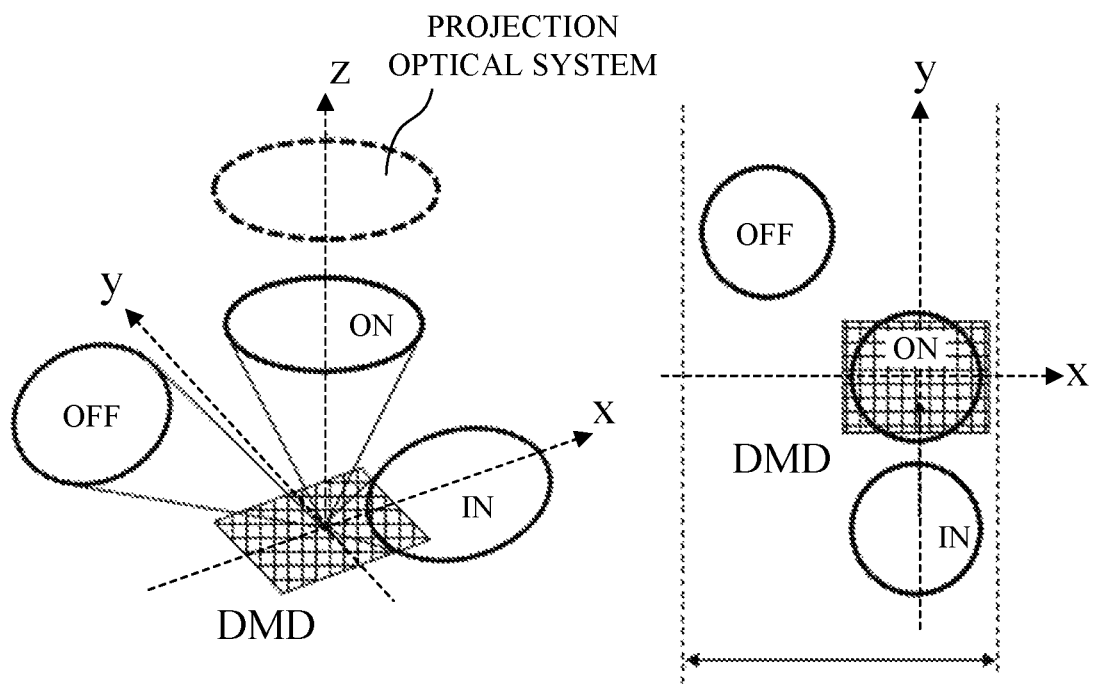
FIGS. 3A and 3B illustrate a behavior of light incident on a digital micromirror device.

Referring now to FIGS. 3A and 3B, a description will be given of a behavior of light incident on the DMD. FIGS. 3A and 3B illustrate the behavior of the light incident on the DMD. FIGS. 3A and 3B are perspective and front views of the DMD, respectively. The illumination light (IN light hereinafter) is obliquely incident to the normal of the DMD. When the micromirror is in the ON state in the DMD, the micromirror has a tilt along the yz section. Thus, when the illumination system IN is obliquely incident along the yz section, the ON light travels in the normal direction of the image display area of the DMD. The "normal direction" also includes a direction substantially regarded as a normal direction or a "substantially normal direction". When the micromirror is in the OFF state, the micromirror has a tilt along the xz section. Thus, as the IN light is obliquely incident along the yz section, the OFF light travels in the diagonal direction having vector components of the yz section and the xz section. A circular shape enclosing the IN light, the ON light, and the OFF light indicate the angular distribution of the light when the light enters the DMD or is emitted from the DMD.

The ON light emitted from each image display element is totally reflected again on the P3 and P4 planes, travels to the P2 plane, is chromatically combined, and then reenters the P1 plane. The P1 plane is configured to transmit the ON light when the micromirror is switched to the ON state. Hence, the ON light is guided to the projection optical system 16 disposed on the transmission light path side of the total reflection prism 12, and an image is displayed. Since the blue light L1 and the phosphor light $L_{phos}$ are sequentially emitted from the light source unit, a full color image can be projected by switching the input image signal between two image display elements in synchronization with this switching period.

Members such as a drive circuit board for driving the element and a heat sink for cooling are arranged on the back surface of each image display element. An image display element unit includes each image display element and the members disposed on the back surface. In order to dispose the image display element unit, a space is required which is larger than the area of the image display area of the image display element and larger than the volume of the image display element. It is thus necessary to properly determine the size of the color separation prism 13 so as to avoid interference between the image display element units or between the image display element unit and the color separation prism 13.

Figures 4A, 4B, 4C:
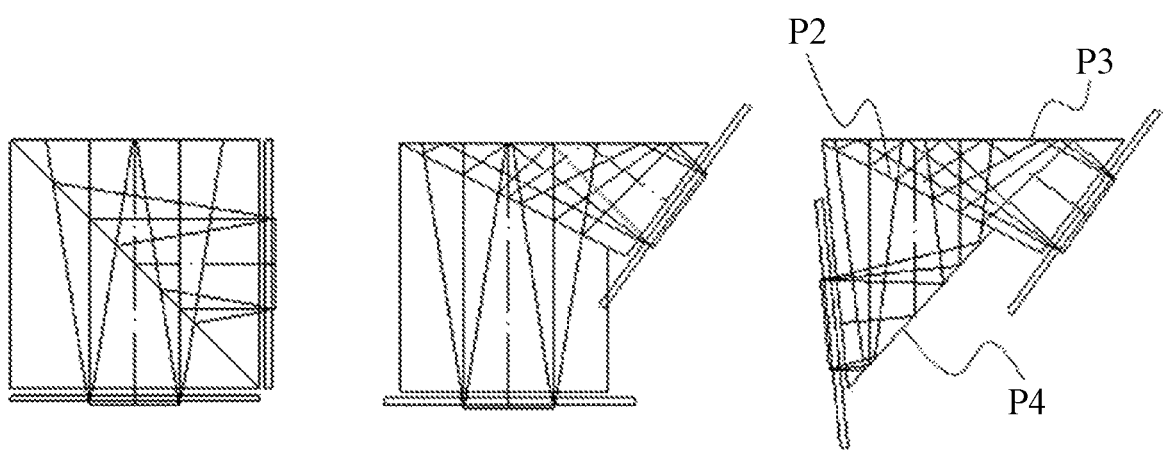
FIGS. 4A to 4C compare the conventional color separation prism with a color separation prism according to the first embodiment.

FIGS. 4A to 4C compare a general color separation prism and the color separation prism 13 of this embodiment with each other. FIGS. 4A to 4C respectively illustrate a cube-type color separation prism, a Phillips-type color separation prism, and the color separation prism 13 according to this embodiment.

The cube-type color separation prism illustrated in FIG. 4A causes the interference between the image display element units, so if the image display element unit becomes larger, the color separation prism should be made larger or the image display element should be separated from the color separation prism.

In the Philips-type color separation prism in FIG. 4B, the interference is likely to occur between the color separation prism and the image display element unit. In order to avoid this problem, it is necessary to separate the image display element from the color separation prism, but since the light flux emitted from the image display element has an angular distribution, the size of the color separation prism increases as the image display element is separated from the color separation prism.

In the color separation prism 13 according to this embodiment in FIG. 4C, the P2 plane guides (directly) the red light and the blue light among light from the P1 plane to the P3 plane, and guides the green light, which has a wavelength different from that of each of the red light and blue light among the light from the P1 plane, to the P4 plane. The P3 plane totally reflects the red light and the blue light from the P2 plane to guide it to the first image display element 14, and totally reflects the light from the first image display element 14 to guide it to the projection optical system 16. The P4 plane totally reflects the green light from the P2 plane and guides the green light to the second image display element 15, and totally reflects the light from the second image display element 15 to guide it to the projection optical system 16. With this configuration, this embodiment disposes the first image display element 14 and the second image display element to face each other via the color separation prism 13. Thus, for example, by increasing the size of the heat sink in order to enhance the cooling performance, a waste space to avoid the interference between the image display element units or between the image display element unit and the color separation prism 13 can be eliminated even if the image display element units become larger. Thus, this embodiment can make the color separation prism much smaller than the prior art. As long as the size of the color separation prism 13 is the same, the size of the image display unit may be increased, so that the size of the heat sink may be increased to enhance the cooling performance, and the drive circuit may have a design freedom.

Figure 5A:
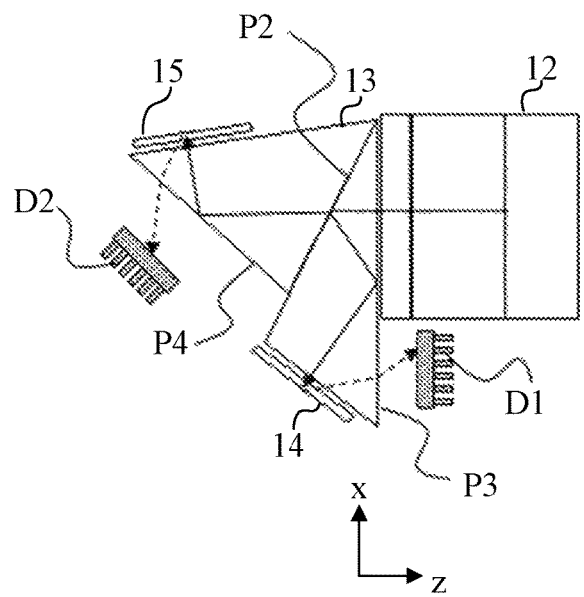
FIGS. 5A and 5B explain OFF light processing according to the first embodiment.
Figure 5B:
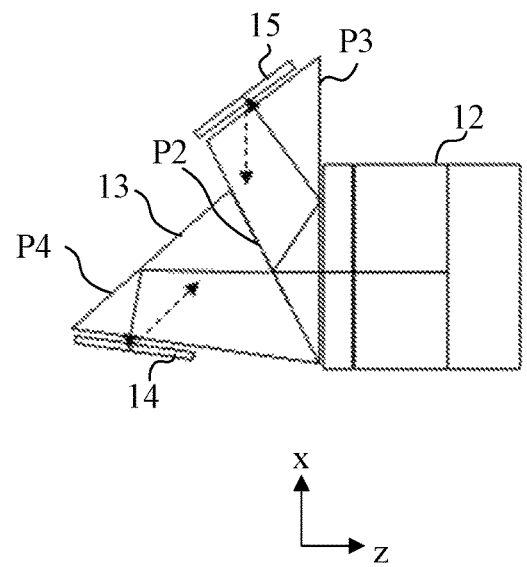

Furthermore, this embodiment can properly process the OFF light. FIGS. 5A and 5B are explanatory diagrams of the OFF light processing according to this embodiment. FIG. 5A illustrates an illustrative configuration of the OFF light processing of the color separation prism 13. As illustrated in FIGS. 3A and 3B, when the incident direction of the IN light is along the yz section, the OFF light has a vector component not only on the yz section but also on the xz section for the image display element. As illustrated in FIG. 5A, the xz section is a section orthogonal to the P2, P3, and P4 planes. The yz section is a section orthogonal to the xz section and orthogonal to the P1 plane. In other words, the color separation and combination system has the P1 plane orthogonal to the yz section and the P2, P3, and P4 planes orthogonal to the xz section among the xz section and the yz section orthogonal to each other. Herein, the term "orthogonal" includes substantially orthogonal or "almost orthogonal".

Thus, the OFF light indicated by the dotted line enters the P3 and P4 planes at an angle smaller than the incident angles of the first color light and the second color light chromatically separated by the P2 plane on the P3 and P4 planes, and the incident angles of the ON light on the P3 and P4 planes. Thus, the OFF light transmits through the P3 and P4 planes by setting the angle of each surface such that the OFF light enters the P3 and P4 planes at angles smaller than the critical angle. The OFF light can be properly processed by arranging the OFF light processing units (unnecessary light processing units) D1 and D2 such as a metal absorber at locations which the transmitting OFF light reaches.

This embodiment processes the OFF light by transmitting the OFF light on the P3 and P4 planes using switching of the optical path according to the critical angle. It is thus unnecessary to secure an extra optical path in the color separation prism 13 in order to secure the optical path of the OFF light unlike the prior art.

Figure 6A:
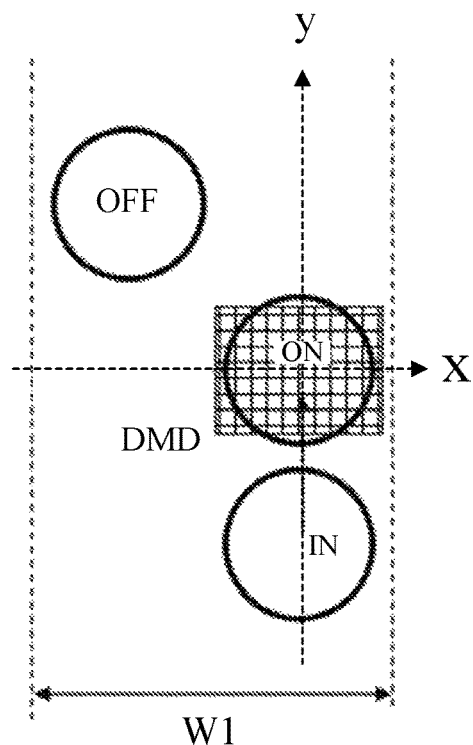
FIGS. 6A and 6B compare angular distributions of a light flux before and after the light flux enters the image display element (first embodiment).
Figure 6B:
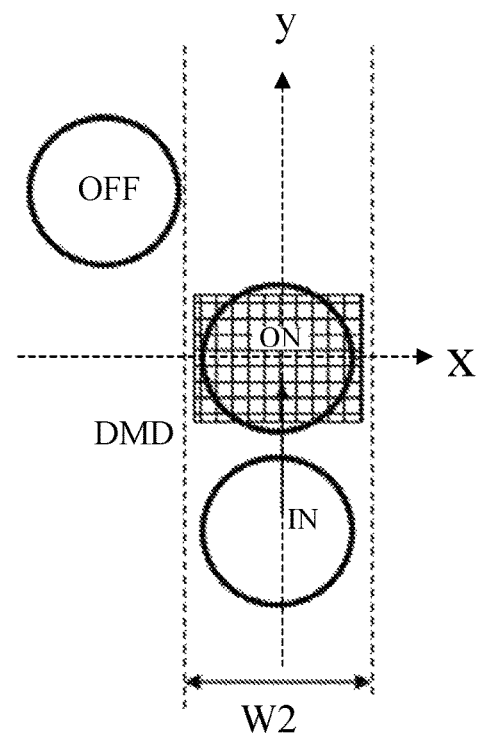

FIGS. 6A and 6B compare the angular distribution of the light flux before and after the light flux enters the DMD. FIG. 6A illustrates the angular distribution of light flux with the conventional color separation prism. FIG. 6B illustrates the angular distribution of the light flux when the color separation prism 13 according to this embodiment is used. As illustrated in FIG. 6A, prior art increases the width W1 of the color separation prism along the x direction in order to prevent the OFF light from being scattered in the color separation prism. On the other hand, as illustrated in FIG. 6B, this embodiment may secure only the width through which the IN light and the ON light pass in the width W2 of the color separation prism 13, in order to transmit the OFF light through the P3 and P4 planes. Therefore, this embodiment can make the color separation prism 13 much smaller, and reduce the back focus of the projection optical system 16.

This embodiment uses to switch the optical path according to the critical angle, and thus can emit the OFF light in the direction away from the ON light. Thus, unlike the prior art, the OFF light is not guided to a location just above the ON light. In particular, in the light path on the P4 plane side, the OFF light can be transmitted in the direction opposite to the projection optical system 16, so mixing of the OFF light into the projection optical system 16 can be avoided unlike the light path on the P3 plane side. This embodiment introduces the green light into the second image display element 15 via the P4 plane. The risk of the ghost can be further reduced by guiding the green light which is high in relative visual sensitivity and easily visible when it becomes the ghost to the side advantageous to the OFF light processing.

An antireflective film may be applied to the P4 plane. While the P3 plane also transmits the ON light and usually needs the antireflection film, the P4 plane transmits only the OFF light. If only the optical path of the ON light is considered, it is unnecessary to apply the antireflective film to the P4 plane. However, by applying the antireflection film to the P4 plane in consideration of the optical path of the OFF light, the reflection of the OFF light can be reduced on the P4 plane and the OFF light can be processed more properly.

Even the right and left reversed configuration of the color separation prism 13 for the configuration of FIG. 5A, as illustrated in FIG. 5B, can provide the miniaturization effect from the viewpoint of the interference of the image display element unit. However, the OFF light in the configuration of FIG. 5B may not be more properly processed than the configuration of FIG. 5A because the OFF light does transmit through the P3 and P4 planes. Thus, the configuration of FIG. 5B may be used when the luminance of the light source is relatively low and the OFF light processing is insignificant.

As described above, the configuration of this embodiment can make smaller the color separation prism 13 for guiding light to the mirror reflection type image display element, and properly process the OFF light (unnecessary light).

Second Embodiment

This embodiment can make the angular distribution of the incident light flux on the xz section smaller than that on the yz section by adjusting the shape and configuration of the illumination optical system 10. This asymmetric angle distribution can be easily realized by using a decentered fly's eye or a tapered rod integrator as the fly's eye lens or rod integrator usually provided in the illumination optical system 10. Since this technique is well-known, a description thereof will be omitted. The other optical configuration of this embodiment is the same as that of the first embodiment, and a detailed description will be omitted.

FIGS. 7A and 7B compare with each other the angular distributions of the light flux before and after it enters the image display element. FIG. 7A illustrates the angular distribution of the light flux according to the first embodiment. FIG. 7B illustrates the angular distribution of the light flux according to this embodiment. In FIG. 7A, the angular distribution of the IN light (incident light flux) is circular, and the angular distribution of the IN light on the xz section and the angular distribution of the IN light on the yz section are equal to each other. In FIG. 7B, the angular distribution of the IN light is elliptical, and the angular distribution of the IN light on the xz section is smaller than the angular distribution of the IN light on the yz section. In other words, there is a first section (xz section) and a second section (yz section) each including the normal of the image display element and orthogonal to each other, and among the angular distributions of incident light fluxes incident on the image display element, the angular distribution of the incident beam on the first section is smaller than that on the second section. As described in the first embodiment, the yz section is orthogonal to the P1 plane, and the xz section is orthogonal to each of the P2, P3, and P4 planes.

The configuration according to this embodiment transmits the OFF light through the P3 and P4 planes. As described in the first embodiment, this embodiment transmits the OFF light using light switching according to the critical angle, and therefore when the angular distribution of the incident light flux on the xz section is excessively wide, part of the OFF light has the critical angle or higher and is totally reflected toward the projection light path side. This embodiment can suppress the leak light component by reducing the angular distribution of the incident light flux on the xz section, and properly process the OFF light.

In general, the reduced angular distribution of the incident light flux degrades the light utilization efficiency in the illumination optical system. Accordingly, this embodiment suppresses the deterioration of the light utilization efficiency by enlarging the angle distribution of the incident light flux on the yz section orthogonal to the xz section. Even if the angular distribution of the incident light flux on the yz section is increased, the OFF light processing is not adversely affected.

As described above, in addition to the effects described in the first embodiment, the configuration of this embodiment can maintain the light utilization efficiency or the brightness of the projection image while properly processing the OFF light. Further, since the angular distribution of the incident light flux on the xz section becomes narrower, the width W3 of the color separation prism 13 on this section can be much smaller. This configuration can further shorten the back focus of the projection optical system 16.

Third Embodiment

In this embodiment, the configuration of the color separation prism 13 is different from that of the first embodiment. The other optical configuration of this embodiment is the same as that of the first embodiment, and thus a detailed description thereof will be omitted.

FIGS. 8A to 8C are configuration diagrams of the color separation and combination system according to this embodiment. FIGS. 8A to 8C illustrate a three-dimensional view, a side view, and a top view of the color separation and combination system, respectively. In this embodiment, the color separation prism 13 is an optical element in which three triangular prisms are joined via the P2 and P3 planes. As illustrated in FIGS. 8A to 8C, the color separation prism 13 includes an additional prism having a P5 plane in addition to the configuration of the first embodiment. In this embodiment, an air gap layer is adjacent to the P3 plane, similar to the P1 plane. The P2 plane guides (directly) the red light and the blue light among the light from the P1 plane to the P3 plane, and guides (directly) the green light having a wavelength different from that of each of the red light and the blue light among the light from the P1 plane, to the P4 plane. The P3 plane totally reflects the red light and the blue light from the P2 plane to guide them to the first image display element 14, and totally reflects the light from the first image display element 14 to guide it to the projection optical system 16. The P4 plane totally reflects the green light from the P2 plane and guides it to the second image display element 15, and totally reflects the light from the second image display element 15 to guide it to the projection optical system 16.

Figure 9:
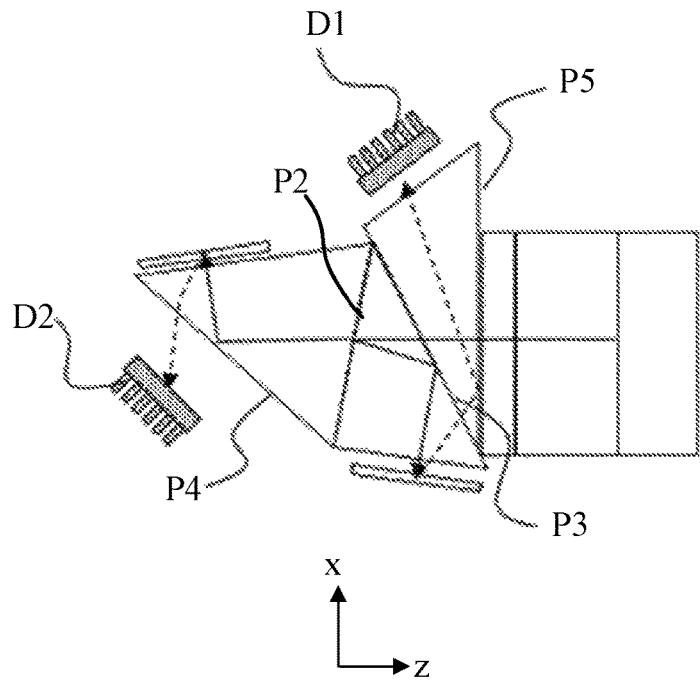
FIG. 9 explains the OFF light processing according to the third embodiment.

FIG. 9 explains OFF light processing according to this embodiment. In this embodiment, the P5 plane totally reflects the OFF light transmitting through the P3 plane, and guides it to the OFF light processing unit D1 provided on the exit side of the additional prism. Since the first embodiment directly guides the OFF light transmitting through the P3 plane to the OFF light processing unit D1, the OFF light processing unit D1 is disposed near the side surface of the projection optical system 16. In this case, part of the light may enter the side surface of the total reflection prism 12 and the projection optical system 16. On the other hand, in this embodiment, the P5 plane totally reflects the OFF light transmitting through the P3 plane and guides it to the OFF light processing unit D1. In other words, the OFF light can be guided to the side different from the side where the projection optical system 16 and the total reflection prism 12 are disposed. Thus, the stray light is less likely to enter the projection optical system 16. Similar to the first embodiment, the P4 plane transmits the OFF light.

Further, the P2 plane in this embodiment includes the color separating dielectric multilayer film, but the angle of the film surface to the light flux is shallower than that of the first embodiment. This configuration can reduce the design difficulty of the film.

The P3 plane may be provided with a dielectric multilayer film that cuts the light having a predetermined wavelength such as the 500 nm band and the 600 nm band. If the light in the 500 nm or 600 nm band is selectively cut, the green or red color reproduction range of the projected image can be expanded, but the cut light becomes unnecessary light. Since the cut light can be simultaneously processed by the OFF light processing unit D1 through the total reflection on the P5 plane, the configuration according to this embodiment needs no new OFF light processing unit for expanding the color gamut.

Fourth Embodiment

This embodiment is different from the first embodiment in that the third image display element 17 is disposed on one surface of the additional prism in addition to the configuration of the color separation prism described in the third embodiment. The other optical configuration according to this embodiment is the same as that of the first embodiment, and thus a detailed description thereof will be omitted.

Figures 10A, 10B, 10C:
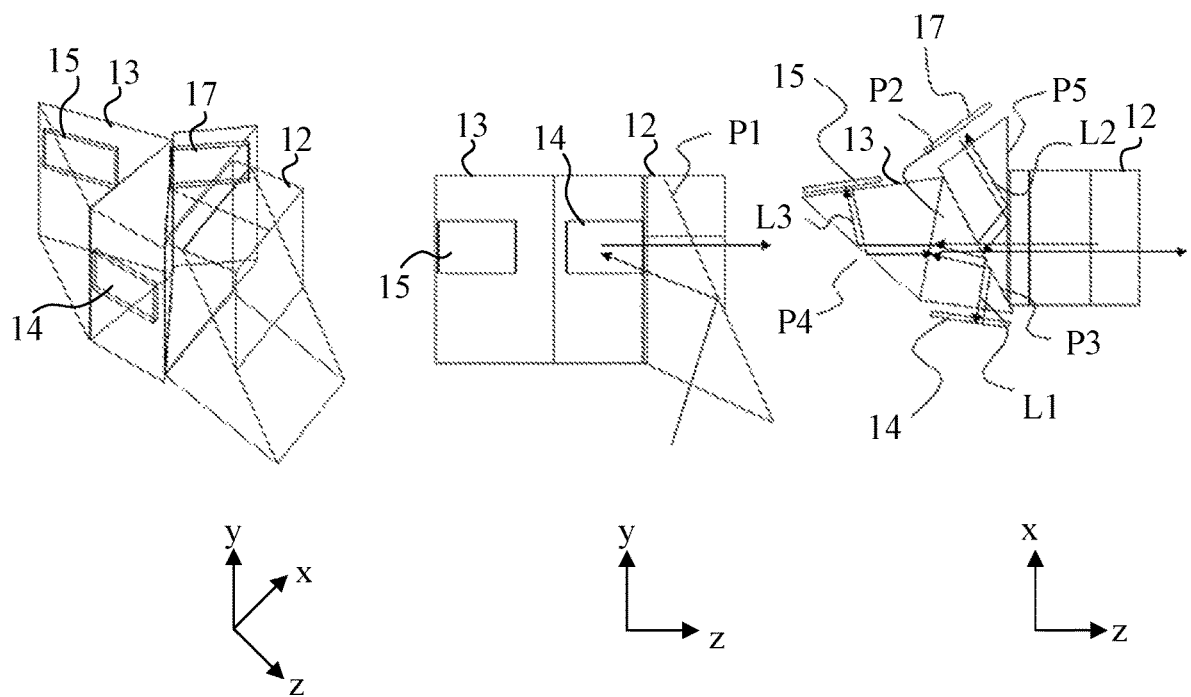
FIGS. 10A to 10C are configuration diagrams of a color separation and combination system according to a fourth embodiment.

FIGS. 10A to 10C are configuration diagrams of a color separation and combination system according to this embodiment. FIGS. 10A to 10C are a three-dimensional view, a side view, and a top view of a color separation and combination system, respectively. The P2 plane guides (directly) the blue light among the light from the P1 plane to the P3 plane, and guides (directly) the green light having a wavelength different from that of the blue light among the light from the P1 plane to the P4 plane. The P3 plane totally reflects the blue light from the P2 plane and guides it to the first image display element 14, and also totally reflects the light from the first image display element 14 and guides it to the projection optical system 16. The P4 plane totally reflects the green light from the P2 plane and guides it to the second image display element 15, and totally reflects the light from the second image display element 15 to guide it to the projection optical system 16.

In this embodiment, in addition to the same air gap layer as that of the third embodiment, the P3 plane includes a dielectric multilayer film that reflects the red light band of 600 to 700 nm. Thereby, the red light is reflected by the P3 plane, and is guided to the third image display element 17 through the total reflection of the P5 plane. As described above, the blue light enters the first image display element 14 and the green light enters the second image display element 15. Thereby, the above embodiment can distribute the red light, the green light, and the blue light that have been divided into the two image display elements, to the three image display elements, respectively. In the above embodiment, the blue light and phosphor light are sequentially emitted from the light source unit, and a full-color image can be projected in the time-division display by inputting the image signals by the two image display elements in synchronization with the switching timing. However, the time-division display inevitably causes a so-called color break phenomenon in which an instantaneous change in color is visually recognized in the projected image. This embodiment provides three image display elements corresponding to the red light, the green light, and the blue light, and can prevent the color break phenomenon.

Figure 11:
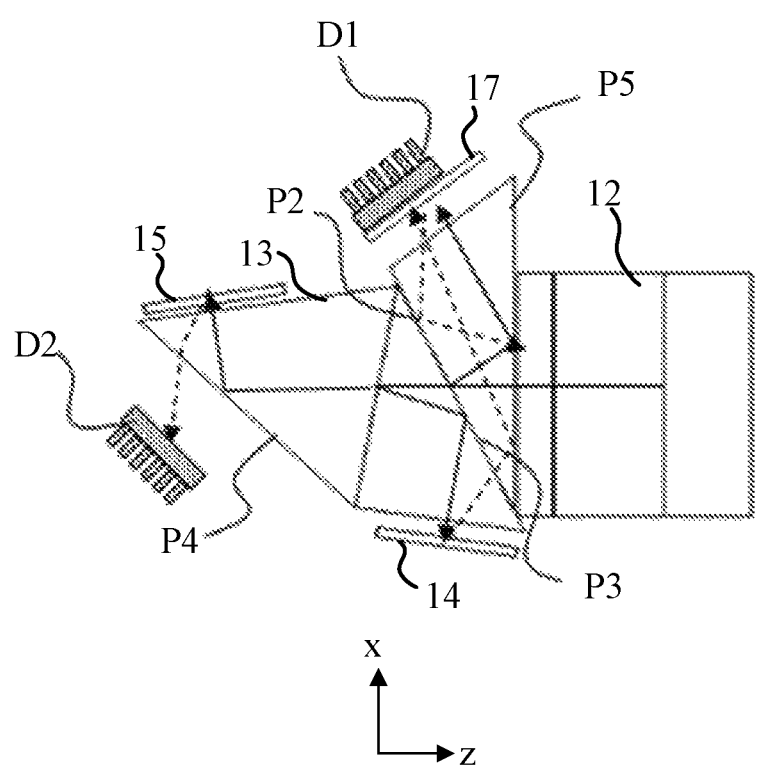
FIG. 11 explains OFF light processing according to the fourth embodiment.

FIG. 11 explains OFF light processing according to this embodiment. The behavior of the OFF light emitted from the first image display element 14 and the second image display element 15 is the same as that of the third embodiment. In other words, the OFF light transmits through the P4 plane and is guided to the OFF light processing unit D2, and the OFF light transmits through the P3 plane and then is totally reflected by the P5 plane and guided to the OFF light processing unit D1. This embodiment disposes the third image display element 17 on the side where the OFF light processing unit D1 is disposed, but since the OFF light has a vector component on the yz direction, the OFF light processing unit D1 can be disposed just above the y direction of the third image display element 17.

Further, in this embodiment, since the OFF light emitted from the third image display element 17 cannot pass through the P5 plane due to the configuration, it is reflected by the P3 plane and travels to the projection optical system 16 side as illustrated in FIG. 11. In other words, the stray light may occur. Thus, the color light incident on the third image display element 17 may be the red light, which has the least power among the red light, the green light, and the blue light.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the wavelength band of the color separation in the P2 plane may be made different. The above embodiment transmits the green light, but may transmit the green light and the blue light. In a white light source unit configured to emit the blue laser light and phosphor light, the light power tends to be larger in order of the red light, the blue light, and the green light when the white balance is properly set as an image projection apparatus. The P4 plane, which is more suitable for the OFF light processing, may transmit the green light and the blue light with high powers to absorb them in the metal absorber, which is then intensively cooled so as to simplify the OFF light processing mechanism on the P3 plane side which the red light with the low power enters.

This application claims the benefit of Japanese Patent Application No. 2018-131994, filed on Jul. 12, 2018, which is hereby incorporated by reference herein in its entirety.

What is claimed is:

1. A color separation and combination system configured to guide light from a light source to a first image display element and a second image display element, to combine light from the first and second image display elements, and to guide combined light to a projection optical system, the color separation and combination system comprising:
a first optical system including a first optical plane; and
a second optical system including a second optical plane, a third optical plane, and a fourth optical plane,
wherein the first optical plane guides the light from the light source to the second optical plane,
wherein the second optical plane guides first color light among light from the first optical plane to the third optical plane, and guides second color light having a wavelength different from that of the first color light among the light from the first optical plane to the fourth optical plane,
wherein each of the first image display element and the second image display element is configured to transfer from one of a first state that reflects a light flux in a normal direction of an image display area and a second state that reflects the light flux in a direction inclined to the normal direction to the other of the first and second states,
wherein the third optical plane totally reflects the first color light toward the first image display element, and totally reflects light from the first image display element in the first state via the second optical plane toward the projection optical system,
wherein the third optical plane transmits the light from the first image display element in the second state,
wherein the fourth optical plane totally reflects the second color light toward the second image display element, and totally reflects light from the second image display element in the first state toward the projection optical system, and
wherein the fourth optical plane transmits the light from the second image display element in the second state.

2. The color separation and combination system according to claim 1, further comprising an antireflection film on the fourth optical plane.

3. The color separation and combination system according to claim 1, wherein the second color light is green light.

4. The color separation and combination system according to claim 1, wherein a first section is set to a section orthogonal to each of the second, third, and fourth optical planes, and including a normal to the first image display element, and a second section is set to a section including the normal to the first image display element, and
wherein an angular distribution of the first section is smaller than that of the second section among an angular distribution of an incident light flux incident on the first image display element or the second image display element.

5. The color separation and combination system according to claim 1, wherein the third optical plane includes an air gap layer.

6. The color separation and combination system according to claim 5, further comprising a dielectric multilayer film configured to reflect light of a predetermined wavelength on the third optical plane.

7. An image projection apparatus comprising:
a light source;
a first image display element;
a second image display element;
an illumination optical system configured to illuminate the first and second image display elements using light from the light source; and
a color separation and combination system configured to guide light from the light source to the first and second image display elements, to combine light from the first and second image display elements, and to guide combined light to a projection optical system,
wherein the color separation and combination system comprises:
a first optical system including a first optical plane; and
a second optical system including a second optical plane, a third optical plane, and a fourth optical plane,
wherein the first optical plane guides the light from the light source to the second optical plane,
wherein the second optical plane guides first color light among light from the first optical plane to the third optical plane, and guides second color light having a wavelength different from that of the first color light among the light from the first optical plane to the fourth optical plane,
wherein each of the first image display element and the second image display element is configured to transfer from one of a first state that reflects a light flux in a normal direction of an image display area and a second state that reflects the light flux in a direction inclined to the normal direction to the other of the first and second states,
wherein the third optical plane totally reflects the first color light toward the first image display element, and totally reflects light from the first image display element in the first state via the second optical plane toward the projection optical system,
wherein the third optical plane transmits the light from the first image display element in the second state,
wherein the fourth optical plane totally reflects the second color light toward the second image display element, and totally reflects light from the second image display element in the first state toward the projection optical system, and
wherein the fourth optical plane transmits the light from the second image display element in the second state.

8. A color separation and combination system comprising a prism optical system, and configured to guide light from a light source to a first image display element and a second image display element using the prism optical system, to combine light from the first and second image display elements, and to guide combined light to a projection optical system,
wherein the prism optical system includes:
a first optical plane;
a second optical plane;
a third optical plane; and
a fourth optical plane,
wherein the first optical plane guides the light from the light source to the second optical plane,
wherein the second optical plane guides first color light among light from the first optical plane to the third optical plane, and guides second color light having a wavelength different from that of the first color light among the light from the first optical plane to the fourth optical plane,
wherein each of the first image display element and the second image display element is configured to transfer from one of a first state that reflects a light flux in a normal direction of an image display area and a second state that reflects the light flux in a direction inclined to the normal direction to the other of the first and second states,
wherein the third optical plane totally reflects the first color light toward the first image display element, and totally reflects light from the first image display element in the first state via the second optical plane toward the projection optical system,
wherein the third optical plane transmits the light from the first image display element in the second state,
wherein the fourth optical plane totally reflects the second color light toward the second image display element, and totally reflects light from the second image display element in the first state toward the projection optical system, and
wherein the fourth optical plane transmits the light from the second image display element in the second state.

9. An image projection apparatus comprising:
a light source;
a first image display element;
a second image display element;
an illumination optical system configured to illuminate the first and second image display elements using light from the light source; and
a color separation and combination system configured to guide light from a light source to the first and second image display elements using a prism optical system, to combine light from the first and second image display elements, and to guide combined light to a projection optical system,
wherein the prism optical system includes:
a first optical plane;
a second optical plane;
a third optical plane; and
a fourth optical plane,
wherein the first optical plane guides the light from the light source to the second optical plane,
wherein the second optical plane guides first color light among light from the first optical plane to the third optical plane, and guides second color light having a wavelength different from that of the first color light among the light from the first optical plane to the fourth optical plane,
wherein each of the first image display element and the second image display element is configured to transfer from one of a first state that reflects a light flux in a normal direction of an image display area and a second state that reflects the light flux in a direction inclined to the normal direction to the other of the first and second states,
wherein the third optical plane totally reflects the first color light toward the first image display element, and totally reflects light from the first image display element in the first state via the second optical plane toward the projection optical system,
wherein the third optical plane transmits the light from the first image display element in the second state,
wherein the fourth optical plane totally reflects the second color light toward the second image display element, and totally reflects light from the second image display element in the first state toward the projection optical system, and wherein the fourth optical plane transmits the light from the second image display element in the second state.

* * * * *